Oct. 2, 1923.
M. O'CONNOR
RESILIENT WHEEL
Filed March 26, 1923     2 Sheets-Sheet 2
1,469,393
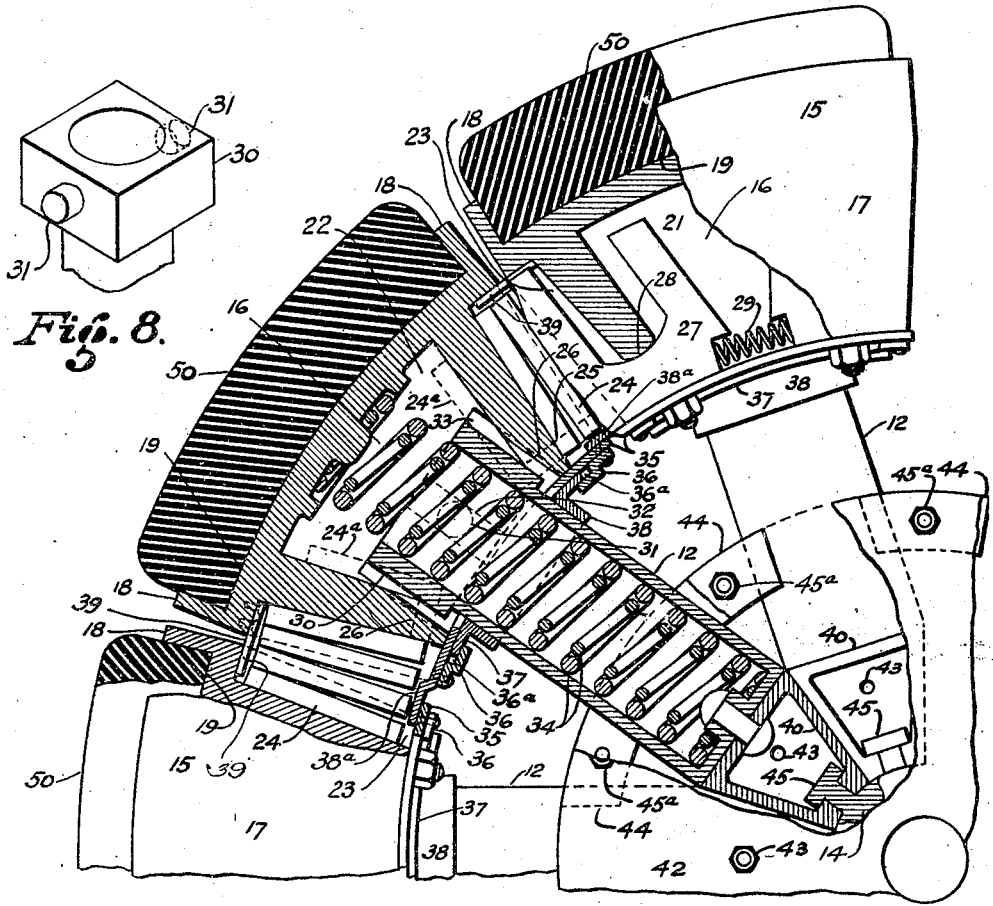
Fig. 8.
Fig. 6.
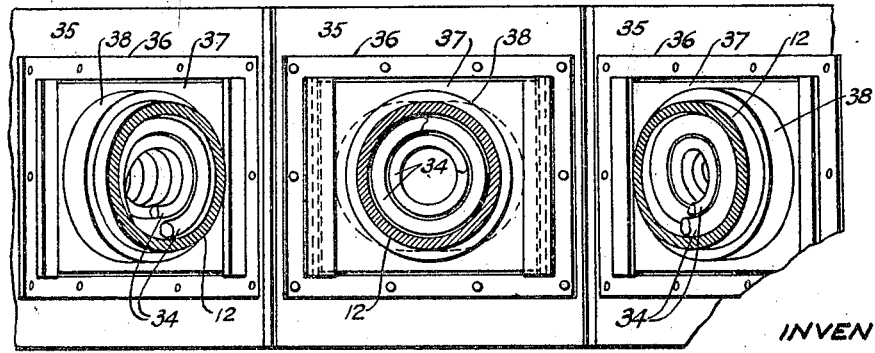
Fig. 7.
INVENTOR.
MAURICE O'CONNOR.
BY Dewey Strong,
Townsend and Loftus.
ATTORNEYS.

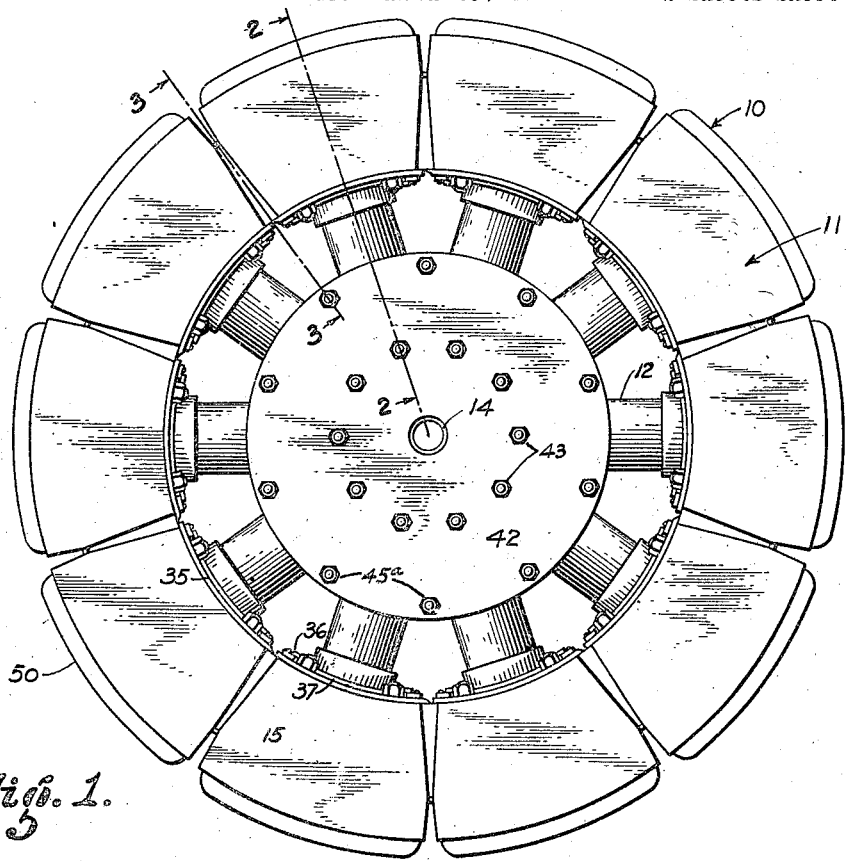

Patented Oct. 2, 1923.

1,469,393

UNITED STATES PATENT OFFICE.

MAURICE O'CONNOR, OF ALAMEDA, CALIFORNIA.

RESILIENT WHEEL.

Application filed March 26, 1923. Serial No. 627,642.

*To all whom it may concern:*

Be it known that I, MAURICE O'CONNOR, a citizen of the United States, residing at Alameda, county of Alameda, and State of California, have invented new and useful Improvements in Resilient Wheels, of which the following is a specification.

This invention relates to resilient wheels of the flexible rim type.

It is the object of the present invention to provide a generally improved vehicle wheel of the type referred to which is designed to resist lateral and circumferential thrust and to locally absorb road shocks without imparting them to the vehicle supported by the wheel.

In carrying out this object, I provide a wheel fitted with a rim composed of a plurality of sections which are flexibly connected in a manner permitting independent deflection of the sections to obtain maximum resiliency but resisting lateral and circumferential thrust so as to maintain the sections in lateral alignment and prevent distortion of the wheel.

One form which the invention may assume is exemplified in the following description and illustrated by way of example in the accompanying drawings, in which:—

Fig. 1 is a side elevation of a vehicle wheel embodying the preferred form of my invention.

Fig. 2 is a transverse section through the rim thereof taken on line 2—2 of Fig. 1.

Fig. 3 is a similar view taken on line 3—3 of Fig. 1.

Figs. 4 and 5 are perspective views of the locking plates employed.

Fig. 6 is an enlarged fragmentary view partly in side elevation and section disclosing the details of construction.

Fig. 7 is a fragmentary view of the inner surface of the rim with the spokes in section.

Fig. 8 is a fragmentary view in perspective showing the construction of the rim end of the spokes.

Referring more particularly to the accompanying drawings, 10 indicates a vehicle wheel having a rim 11, spokes 12 and a hub 14. The rim 11 is constructed of a plurality of radial rim sections 15 each of which is mounted at the end of one of the spokes 12. The rim sections 15 are identical in construction and each comprise a housing 16 having side walls 17, end walls 18 and a rim portion 19. Intermediate the side walls 17 and extending parallel thereto are partitions 20 which extend between the end walls 18. These partitions divide the interior of the housing 16 into two narrow side compartments 21 and a central compartment 22.

The rim portion 19 and the side walls 17 of each section overlap the end walls 18 at each end so that when the wheel is assembled pockets 23 are formed between the contiguous ends of the rim sections to accommodate pairs of compression and tension springs 24. Two of these springs are disposed side by side in each pocket 23. These springs are preferably wound in a square coil to provide a maximum bearing surface between their contiguous sides and between them and the side walls 17 to aid in resisting lateral thrust on the rim. The ends 24$^a$ of the springs extend through apertures 25 in the end walls 18 and are bent as at 26 across the inner surfaces of said walls so that certain relative movement of the rim sections will be resisted by the tension of the springs.

The end walls of each rim section converge toward the center of the wheel so that the pockets 23 will be outwardly tapered as shown in Fig. 6. Therefore, when the springs are positioned in the pockets 23 the outer portions of the coils will contact, as shown clearly in Fig. 6.

To aid the springs in resisting lateral or side thrust on the rim and to maintain the rim sections in perfect lateral alignment, locking plates 27 are provided. These members extend between the contiguous ends of the rim sections and are slotted as at 28 to embrace the end walls 18 thereof. The plates 27 are located at each side of the rim in the compartments 21 and constitute connections between the rim sections to resist lateral thrust on the rim. The locking plates 27 do not prevent radial and circumferential movement between the rim sections but do prevent relative lateral movement therebetween and therefore serve to rigidly maintain the rim sections in lateral alignment. The members 27 are held in correct position circumferentially of the wheel by means of expansion springs 29 interposed between their contiguous ends as shown in Fig. 6.

The outer end of each spoke is formed with a square head 30 having projecting lugs 31 formed one at each side thereof. The sides of the head 30 slidably engage the inner surfaces of the partitions 20 and the lugs 31 engage elongated slots 32 in these partitions. The lower portion of one of the partitions is formed with a removable section 33 for the sake of convenience in assembling the wheel. The lugs mentioned permit the rim sections to have slight reciprocating and rocking movement at the end of the spokes but serve to maintain the sections in correct circumferential positions and to resist circumferential thrust on the rim. The spokes are tubular and each accommodate a pair of concentrically positioned compression springs 34 which are positioned in the spokes and interposed between the inner ends thereof and the rim portions of the rim sections. These springs resist inward deflection of the rim sections and serve to absorb road shocks without imparting them to the hub of the wheel.

The inner wall of each rim section is formed by a cover plate 35 which is suitably bolted to the inner edges of the side walls of the housing. This plate is fitted with a rectangular frame 36 which is offset at its inner edges to provide guideways 36ª to receive a flange 37 of a guide sleeve 38. The spoke of the rim section is reciprocably mounted in this sleeve. The ends of the flange 37 terminate short of guideways 36ª to allow a limited amount of movement of the rim section relative to the spoke in a circumferential direction only.

One end of the cover plate 35 of each section is offset as at 38ª to overlap the end of the cover plate 35 of the adjacent rim section. The offset portion 38ª of each cover plate is flexible to allow movement between the sections. They also serve to prevent the entrance of sand and grit into the pockets 23. The outer ends of the pockets 23 are protected from the entrance of dirt by flat flexible members 39 which are disposed beneath the overhanging ends of the rim portions of the rim sections. Each of these members is secured at one end to one of the contiguous ends of the rim sections as shown in Fig. 6.

The inner ends of the spokes are fitted with segmental members 40, the sides of which abut to form a rigid connection between the spokes. The inner ends of these members are slotted to engage T-shaped lugs 45 secured around the circumference of the hub proper.

Hub plates 42 are positioned one on each side of the inner ends of the spokes and are held in place by bolts 43. To reinforce the spokes, filler blocks 44 are placed between the spokes and between the hub plates and bolted to the latter by bolts 45ª.

The rim portions of the rim sections are designed to receive tire sections 50 which are preferably formed of resilient material.

In operation, the wheel is constructed as described and may be assembled on a vehicle. Shocks due to inequalities in the road will be absorbed by the springs 24 and 34. The springs 24 allow limited relative movement between the rim sections to permit each section to absorb shocks without imparting them to the entire rim and hub. The springs 34 permit each section a slight amount of radial movement for the same purpose. It is obvious from the foregoing that the rim of the wheel will absorb all minor road shocks and substantially all major ones without imparting them to the hub.

The peculiar mounting of the springs 24 causes the wheel to resist circumferential thrust. That is to say, by forming the springs so that the outer portions of the coils contact, the wheel is substantially rigid circumferentially at the outer edge of the rim sections. This, however, does not detract from the flexibility of the rim as each section is permitted to deflect independently to absorb shocks.

The lateral or side thrust on the wheel is resisted by the locking plates 27 and the springs 24 which maintain the rim sections in lateral alignment.

From the foregoing it is obvious that a very desirable vehicle wheel has been provided which is capable of maximum resiliency and designed to resist lateral and circumferential thrust tending to distort the wheel.

While I have shown the preferred form of my invention, it is understood that various changes in its construction may be made without departing from the spirit of the invention.

Having thus described my invention, what I claim and desire to secure by Letters Patent is:—

1. A resilient wheel comprising a hub, a plurality of rigid spokes extending from the hub, a rim comprising a plurality of flexibly connected sections mounted one at the end of each spoke, and connections between said sections permitting independent deflection thereof but rigidly maintaining them in lateral alignment and resisting lateral thrust on the rim.

2. A resilient wheel comprising a hub, a plurality of rigid spokes extending from the hub, a rim comprising a plurality of flexibly connected sections mounted one at the end of each spoke, radial springs interposed between said spokes and the rim sections to cushion inward deflection thereof, and connections between said rim sections permitting independent deflection thereof and adapted to rigidly maintain said sections in lateral alignment and to resist lateral thrust on the rim.

3. A resilient wheel comprising a hub, a plurality of rigid hollow spokes extending radially from the hub, a rim comprising a plurality of flexibly connected rim sections mounted one at the end of each spoke, springs in the spokes upon which the rim sections bear to cushion inward deflection thereof, and independent locking plates between the contiguous ends of the rim sections, said lock plates being adapted to permit independent deflection of said rim sections but rigidly maintain the sections in lateral alignment and resisting lateral thrust on the rim.

4. A resilient wheel comprising a hub, a plurality of rigid hollow spokes connected to the hub and extending radially therefrom, a flexible rim at the outer ends of the spokes, said rim comprising a plurality of rim sections, compression and tension springs interposed between the contiguous ends of said sections to flexibly connect the same, a connection between each section and a spoke permitting independent deflection of the rim sections, and locking plates at the sides of the rim to connect the rim sections and to resist lateral thrust on the rim and to maintain said sections rigidly in lateral alignment.

5. A resilient wheel comprising a hub, a plurality of rigid hollow spokes connected to the hub and extending radially therefrom, a flexible rim at the outer ends of the spokes, said rim comprising a plurality of rim sections, compression and tension springs interposed between the contiguous ends of said sections to flexibly connect the same, a connection between each section and a spoke permitting independent deflection of the rim sections, and locking plates at the sides of the rim to connect the rim sections and to resist lateral thrust on the rim and to maintain said sections rigidly in lateral alignment, the outer portions of the coils of said springs being in contact with themselves and with the ends of the rim to make the portion of the rim at the outer circumference thereof rigid circumferentially to resist circumferential thrust.

MAURICE O'CONNOR.